United States Patent
Park et al.

(10) Patent No.: US 9,516,618 B2
(45) Date of Patent: Dec. 6, 2016

(54) METHOD AND APPARATUS FOR ACQUIRING SYNCHRONIZATION BETWEEN BASE STATIONS IN MOBILE COMMUNICATION SYSTEM WITH DISTRIBUTED CELL STRUCTURE

(71) Applicants: Samsung Electronics Co., Ltd., Gyeonggi-do (KR); Industry-Academic Cooperation Foundation Yonsei University, Seoul (KR)

(72) Inventors: Jung-Shin Park, Seoul (KR); Sang-Hoon Lee, Seoul (KR); Beom Kwon, Seoul (KR); Seong-Hyun Kim, Seoul (KR); Sang-Hoon Lee, Gyeonggi-do (KR); Ho-Jae Lee, Gyeonggi-do (KR)

(73) Assignees: Samsung Electronics Co., Ltd., Suwon-si (KR); Industry-Academic Cooperation Foundation, Yonsei-University, Seoul (KR)

( * ) Notice: Subject to any disclaimer, the term of this patent is extended or adjusted under 35 U.S.C. 154(b) by 137 days.

(21) Appl. No.: 14/257,891

(22) Filed: Apr. 21, 2014

(65) Prior Publication Data
US 2014/0314069 A1    Oct. 23, 2014

(30) Foreign Application Priority Data

Apr. 19, 2013    (KR) .................. 10-2013-0043861

(51) Int. Cl.
*H04W 56/00*    (2009.01)

(52) U.S. Cl.
CPC ....... *H04W 56/0085* (2013.01); *H04W 56/002* (2013.01)

(58) Field of Classification Search
CPC .......... H04W 56/001; H04W 56/002; H04W 56/0055; H04W 56/0085
See application file for complete search history.

(56) References Cited

U.S. PATENT DOCUMENTS

| | | | |
|---|---|---|---|
| 2010/0054237 A1 | 3/2010 | Han et al. | |
| 2010/0215032 A1* | 8/2010 | Jalloul | H04L 27/2655 370/350 |
| 2015/0030037 A1* | 1/2015 | Ahn | H04L 27/2655 370/503 |
| 2015/0181543 A1* | 6/2015 | Hwang | H04W 56/002 370/336 |

FOREIGN PATENT DOCUMENTS

KR    10-2011-0039377    4/2011

* cited by examiner

Primary Examiner — Paul H Masur
Assistant Examiner — Kabir Jahangir

(57) ABSTRACT

A method for acquiring by a base station (BS) synchronization between BSs in a mobile communication system with a distributed cell structure is provided. The method includes measuring a timing error with other BS as a synchronization target. The method also includes performing a synchronization operation with the other BS using at least one first sub-frame based on the measured timing error, wherein a number of symbols included in a first sub-frame is less than a number of symbols included in a second sub-frame.

20 Claims, 18 Drawing Sheets

(A)

(B)

METHOD AND APPARATUS FOR ACQUIRING SYNCHRONIZATION BETWEEN BASE STATIONS IN MOBILE COMMUNICATION SYSTEM WITH DISTRIBUTED CELL STRUCTURE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Apr. 19, 2013 assigned Serial No. 10-2013-0043861, the entire disclosure of which is incorporated herein by reference.

TECHNICAL FIELD

The present disclosure relates to a method and apparatus for acquiring synchronization in mobile communication system. More particularly, the present disclosure relates to a method and apparatus for acquiring synchronization between base stations (BSs) in a mobile communication system.

BACKGROUND

A mobile communication system has been evolved to a wireless packet data communication system for providing a data service and a multimedia service as well as a voice service. So, mobile communication systems which provide a high speed packet data service such as a high speed downlink packet access (HSDPA) system and a long term evolution (LTE) system, and the like which are proposed in a 3rd generation partnership project (3GPP) have been developed.

In a mobile communication system, a mobile station (MS) may need to acquire synchronization with a base station (BS) in order to perform a communication with the BS, and a process of acquiring synchronization between the MS and the BS will be described below.

A frame structure in a downlink frame in a conventional LTE system supporting a frequency division duplexing (FDD) scheme will be described with reference to FIG. 1.

FIG. 1 is an example of a frame structure in a downlink frame in a conventional LTE system supporting an FDD scheme.

Referring to FIG. 1, a frame structure in FIG. 1 is a frame structure in which a primary synchronization signal (PSS) and a secondary synchronization signal (SSS) for acquiring synchronization in a downlink of a conventional LTE system supporting an FDD scheme.

In FIG. 1, a frame length of a frame 101 can be 10 ms, and the frame 101 can include 10 sub-frames. A sub-frame length of a sub-frame 103 can be 1 ms, and the sub-frame 103 can include 2 slots. A slot length of a slot 105 can be 0.5 ms. In a frame structure supporting an FDD scheme, a PSS 111 can be transmitted on the last orthogonal frequency division multiplexing (OFDM) symbol included in each of a sub-frame #0 and a sub-frame #5, and an SSS 113 can be transmitted on an OFDM symbol just before an OFDM symbol on which the PSS 111 is transmitted. An MS can acquire frame synchronization by receiving the PSS 111 and the SSS 113.

A frame structure in a downlink frame in a conventional LTE system supporting an FDD scheme has been described with reference to FIG. 1, and a slot structure in a downlink frame in a conventional LTE system supporting an FDD scheme will be described with reference to FIG. 2.

FIG. 2 is an example of a slot structure in a downlink frame in a conventional LTE system supporting an FDD scheme.

Referring to FIG. 2, (A) illustrates a slot structure which can use a normal cyclic prefix (CP) on an OFDM symbol, and 7 OFDM symbols can be1 transmitted through one slot. In FIG. 2, (B) illustrates a slot structure which can use an extended CP on an OFDM symbol, and 6 OFDM symbols can be transmitted through one slot. That is, in an LTE system, the number of symbols included in a slot can be changed according to a type of a CP.

In the LTE system, a slot length of one slot can be 0.5 ms, and slot length may not be changed according to a type of a used CP.

Table 1 expresses variables necessary for calculating a CP length and a symbol length and values thereof

TABLE 1

| variable | length | description |
| --- | --- | --- |
| $T_S$ | 0.00325 us | LTE basic time unit |
| $T_U$ | 2048 $T_S \approx$ 66.7 us | LTE symbol length |
| $T_{CP}$ | 2048 $T_S \approx$ 66.7 us | CP length of the first normal CP |
|  | 144 $T_S \approx$ 4.7 us | CP length of each of remaining 6 normal CPs |
| $T_{CP-e}$ | 512 $T_S \approx$ 16.7 us | Extended CP length |

A slot structure in a downlink frame in a conventional LTE system supporting an FDD scheme has been described with reference to FIG. 2, and a frame structure in a downlink frame in a conventional LTE system supporting a time division duplexing (TDD) scheme will be described with reference to FIG. 3.

FIG. 3 is an example of a frame structure in a downlink frame in a conventional LTE system supporting a TDD scheme.

Referring to FIG. 3, a frame length of a frame 301 can be 10 ms, and can include 2 half-frames of which a half-frame length can be 5 ms. A half-frame can include 5 sub-frames. Here, a sub-frame length of a sub-frame can be 1 ms.

A frame structure in a downlink frame in a conventional LTE system supporting a TDD scheme has been described with reference to FIG. 3, and a difference between a frame structure in a downlink in a conventional LTE system supporting a TDD scheme and a frame structure in a downlink in a conventional LTE system supporting an FDD scheme will be described with reference to FIG. 4.

FIG. 4 is an example of a special sub-frame structure in a downlink frame in a conventional LTE system supporting a TDD scheme.

Referring to FIG. 4, unlike a frame structure supporting an FDD scheme, a frame structure supporting the TDD scheme can include a special sub-frame 401 for acquiring synchronization, such as for adjusting a timing, and the special sub-frame 401 can be included in each of the first sub-frame and the sixth sub-frame.

As described above, in an LTE system which uses an OFDM transmission scheme, an MS can receive a special sub-frame in a frame structure of FIG. 1 or FIG. 3 to acquire synchronization.

Meanwhile, a portable terminal which uses a high speed packet service such as a smart phone, and the like has been widely disseminated, so data traffic can exponentially increase in a network, and it can be expected that the data traffic will much more exponentially increase due to more application services which use the portable terminal.

So, in a mobile communication system which can provide a high speed service such as the LTE system, a BS which supports a small cell which has a relatively small service coverage such as a pico cell, a femto cell, a wireless local access network (WLAN), and the like can be additionally deployed for increasing total capability and distributing data traffic, and technologies for distributing data traffic of a BS in a conventional macro cell into a BS in a small cell to maximize use of the BS in the small cell can be used.

Like this, a network structure in which a BS of a macro cell can be co-located with a BS of a small cell in a mobile communication system called a distributed cell structure.

In the distributed cell structure, handover can frequently occur due to a movement of an MS and a service area of a cell can be dynamically changed, so a timing error between BSs of cells can be more likely to occur. The timing error between the BSs can result in a service interruption or a network re-connection of the MS.

So, there can be a need for decreasing a timing error between BSs in a network with a distributed cell structure.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for acquiring synchronization between BSs in a mobile communication system with a distributed cell structure.

Another aspect of the present disclosure is to provide a method and apparatus for transmitting/receiving a sub-frame signal for providing synchronization between BSs in a mobile communication system with a distributed cell structure.

Another aspect of the present disclosure is to provide a method and apparatus for determining a type of a sub-frame for providing synchronization between BSs in a mobile communication system with a distributed cell structure.

In accordance with an aspect of the present disclosure, there is provided a method for acquiring by a base station (BS) synchronization between BSs in a mobile communication system with a distributed cell structure. The method includes measuring a timing error with another BS as a synchronization target. The method also includes performing a synchronization operation with the other BS using at least one first sub-frame based on the measured timing error, wherein a number of symbols included in a first sub-frame is less than a number of symbols included in a second sub-frame.

In accordance with another aspect of the present disclosure, there is provided a base station (BS) in a mobile communication system with a distributed cell structure. The BS includes a communication interface configured to transmit/receive information for measuring a timing error with another BS to/from the other BS. The BS also includes a controller configured to control an operation of measuring the timing error based on the information, and perform a synchronization operation with the other BS using at least one first sub-frame based on the measured timing error, wherein a number of symbols included in a first sub-frame is less than a number of symbols included in a second sub-frame.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
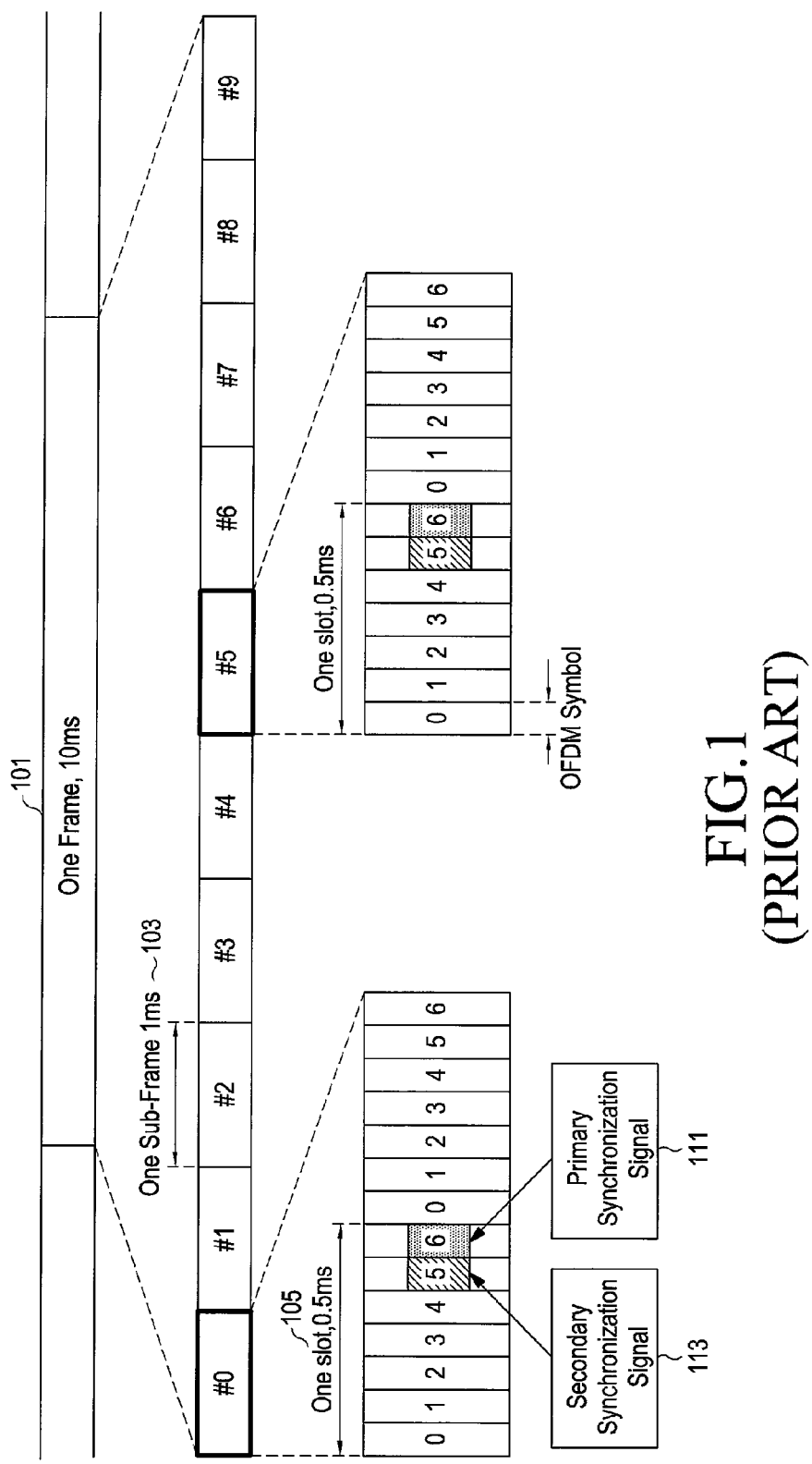
FIG. 1 is an example of a frame structure in a downlink frame in a conventional LTE system supporting an FDD scheme.
Figure 2:
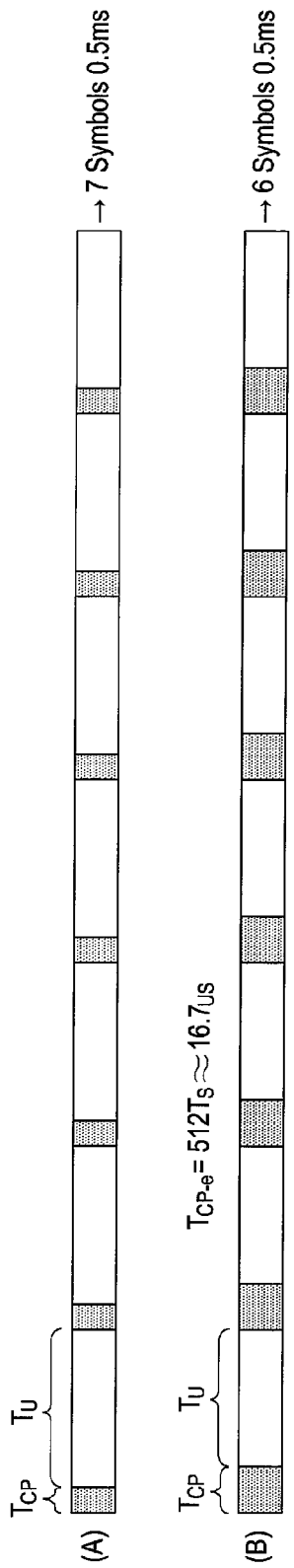
FIG. 2 is an example of a slot structure in a downlink frame in a conventional LTE system supporting an FDD scheme.
Figure 3:
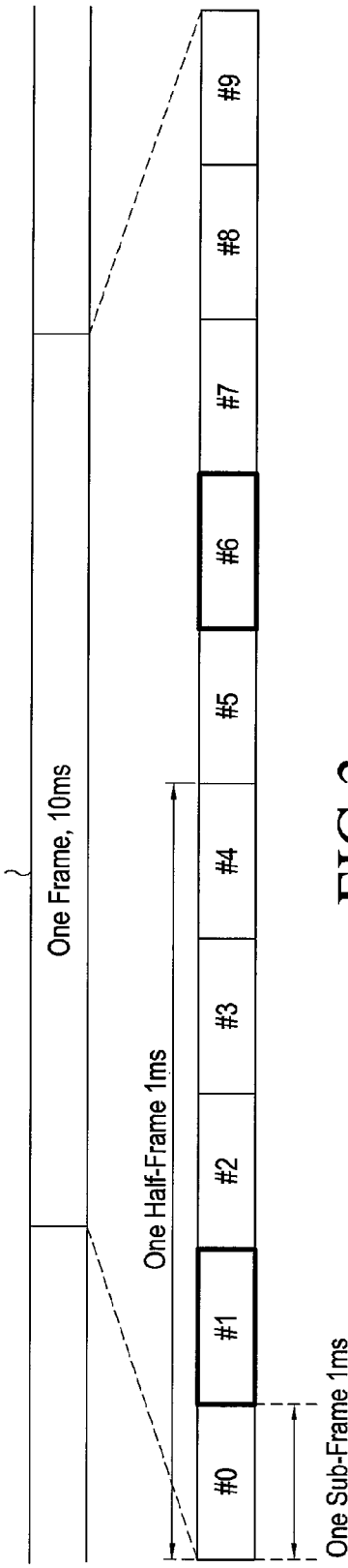
FIG. 3 schematically illustrates a frame structure in a downlink frame in a conventional LTE system supporting a TDD scheme.

FIGS. 5 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions can be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component can be referred to as a second component and likewise, a second component can also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes a method and apparatus for acquiring synchronization between base stations (BSs) in a mobile communication system with a distributed cell structure.

An embodiment of the present disclosure proposes a method and apparatus for transmitting/receiving a sub-frame signal for providing synchronization between BSs in a mobile communication system with a distributed cell structure.

An embodiment of the present disclosure proposes a method and apparatus for determining a type of a sub-frame for providing synchronization between BSs in a mobile communication system with a distributed cell structure.

A scheme of acquiring synchronization between BSs in a mobile communication system according to this disclosure can be applied to a distributed cell structure where a macro cell is co-located with a small cell.

A method and apparatus proposed in various embodiments of this disclosure can be applied to various communication systems such as a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and/or the like.

In the distributed cell structure, joint transmission between BSs can be possible, handover can frequently occur, and a communication radius of a cell through cell breathing or dynamic BS on/off switching can be dynamically changed. A BS of each cell can calculate/estimate a predicted value for a timing error between BSs through an exchange of a packet including a time stamp, and determine whether to perform an operation of acquiring synchronization between BSs through this.

In an embodiment, the distributed cell structure can be used. However, it will be understood by those of ordinary skill in the art that embodiments disclosed herein can be applied to various mobile communication systems which use an orthogonal frequency division multiplexing (OFDM) transmission scheme and where a timing error between BSs can occur.

In an embodiment, it will be understood that a BS can include an eNode, an enhanced node B (ENB), and the like, and a mobile station (MS) can include a user equipment (UE), a terminal, a user device, and the like. An LTE system can be an example of a mobile communication system which uses an OFDM transmission scheme, and it will be noted that with embodiments disclosed herein that it may not be limited to LTE systems.

A situation in which a timing error between BSs can occur in a mobile communication system with a distributed cell structure according to an embodiment of the present disclosure will be described with reference to FIG. 5.

Figure 5:
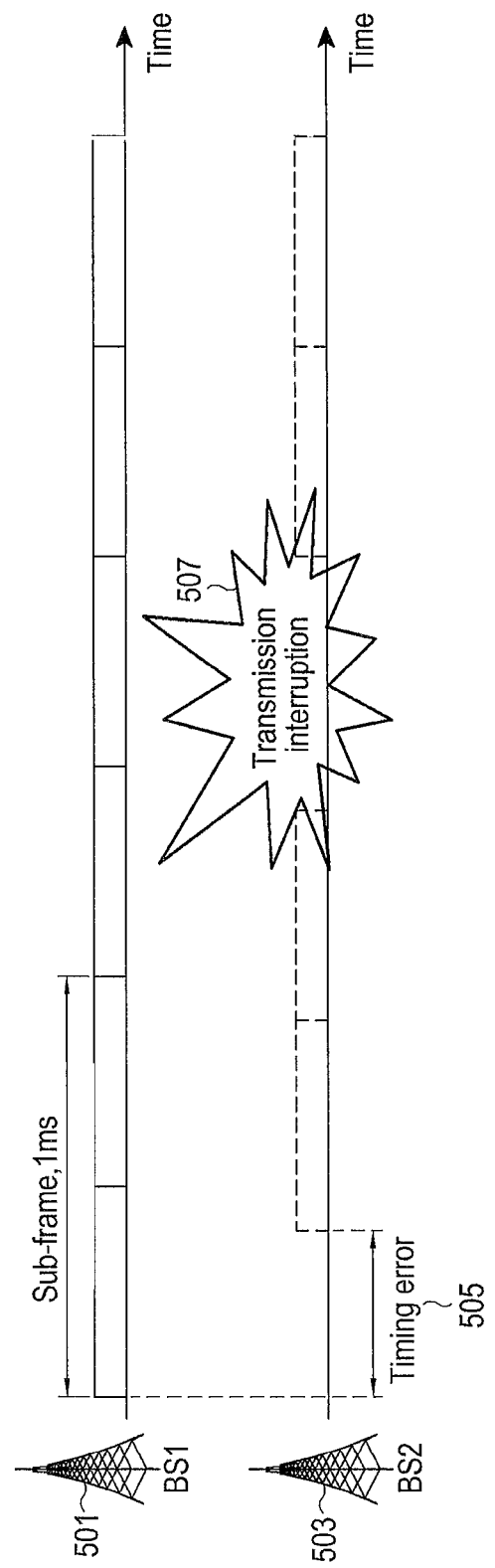
FIG. 5 is an example of a situation in which a timing error between BSs can occur in a mobile communication system with a distributed cell structure according to this disclosure.

FIG. 5 is an example of a situation in which a timing error between BSs can occur in a mobile communication system with a distributed cell structure according to this disclosure.

Referring to FIG. 5, a predicted value of a timing error 505 between BSs can be calculated or measured through an exchange of a packet including a time stamp between the first BS 501 and the second BS 503. If the expected value of the timing error 505 can be detected, a synchronization process between the BSs can start.

If the process of acquiring the synchronization between the BSs starts, data transmission can be interrupted in the second BS 503 during a preset time interval, such as a transmission interruption interval 507. After a process of acquiring synchronization between the first BS 501 and the second BS 503 is completed, mobile stations (MSs) (not shown in FIG. 5) which are connected to the second BS 503 can perform a re-connection operation with the second BS 503. That is, as described in FIG. 5, the second BS 503 can predict the timing error 505 with the first BS 501, and synchronize with the first BS 501 after the transmission interruption interval 507.

In a distributed cell structure, if a process of acquiring synchronization between BSs is performed, data transmission of a BS can be interrupted, and a re-connection operation of an MS can be required. This can result in a service interruption/delay and degradation of a service quality.

In an embodiment, a new sub-frame structure which can resolve a problem of a transmission interruption/re-connection in a case that a process of acquiring synchronization between BSs can be performed, and the new sub-frame structure can be proposed by considering an LTE system.

A structure of a sub-frame in a mobile communication system with a distributed cell structure according to this disclosure will be described with reference to FIG. 6.

Figure 6:
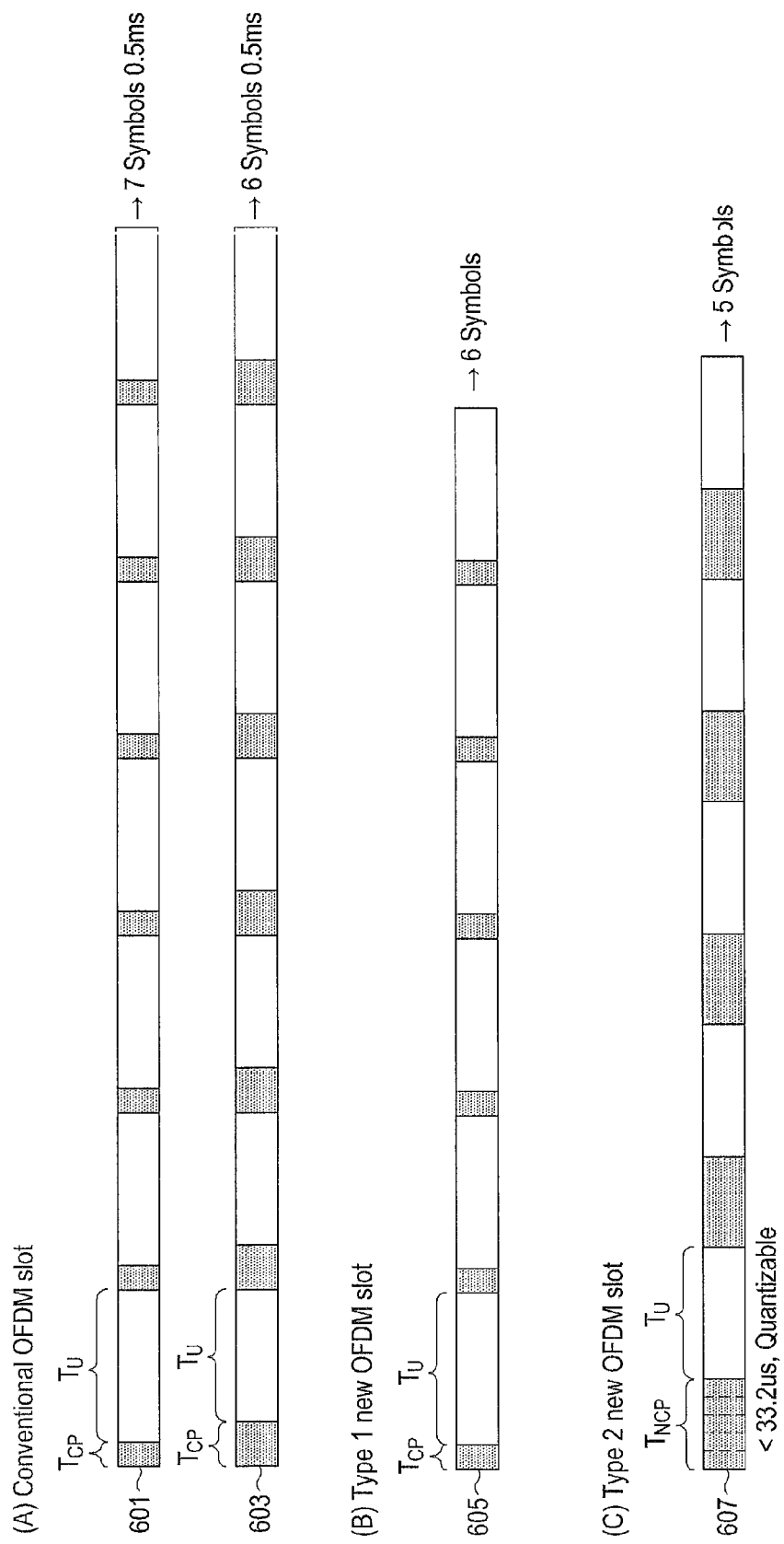
FIG. 6 is an example of a structure of a sub-frame in a mobile communication system with a distributed cell structure according to this disclosure.

FIG. 6 is an example of a structure of a sub-frame in a mobile communication system with a distributed cell structure according to this disclosure.

Referring to FIG. 6, a new sub-frame structure in FIG. 6 can be used on a transmission interruption interval 507 in FIG. 5.

If an LTE system supports a frequency division duplexing (FDD) scheme, a sub-frame can include 2 slots.

An example of a slot structure of a sub-frame in a mobile communication system is illustrated as (B) and (C).

In FIG. 6, (A) illustrates a slot structure 601 including 7 OFDM symbols which can use a normal cyclic prefix (CP) and a slot structure 603 including 6 OFDM symbols which can use an extended CP in a conventional LTE system.

Each of slot structures illustrated as (B) and (C) can have a slot length less than a slot length which is supported in a conventional LTE system 0.5 ms, and can be repetitively used on a transmission interruption interval 507 in FIG. 5 thereby decreasing a timing error between two BSs within a CP length.

In FIG. 6, (B) illustrates the first type of slot structure 605 and (C) illustrates the second type of slot structure 607. TCP can denote a CP length, and TU can denote a symbol length of an OFDM except for the CP length TCP.

The number of OFDM symbols included in one slot in the first type of slot structure 605 can be less than the number of OFDM symbols included in a slot structure 601 by 1. The number of OFDM symbols included in one slot in the first type of slot structure 605 can be 6, and a length of each OFDM symbol can be about 0.43 ms. The number of OFDM symbols included in one slot in the second type of slot structure 607 can be less than the number of OFDM symbols included in each of the slot structure 601 and the slot structure 603 by 1 or 2.

The number of OFDM symbols included in one slot in the second type of slot structure 607 can be 5, and each OFDM symbol has a symbol length greater than 0.43 ms and less than 0.5 ms. A CP length can be variable in an OFDM symbol, so lengths of slots included in the second type of slot structure 607 can be variable. The variable CP length $T_{NCP}$ can be longer than an extended CP length $T_{Cp\text{-}e}$=512 $T_S$≈16.7 μs i in Table 1, and can become long up to 1020 $T_S$≈33.2 μs so that a slot length can be less than 0.5 ms.

A structure of a sub-frame in a mobile communication system with a distributed cell structure has been described with reference to FIG. 6, and a region of a sub-frame on which a control signal or a reference signal may not be transmitted in a mobile communication system with a distributed cell structure will be described with reference to FIG. 7.

Figure 7:
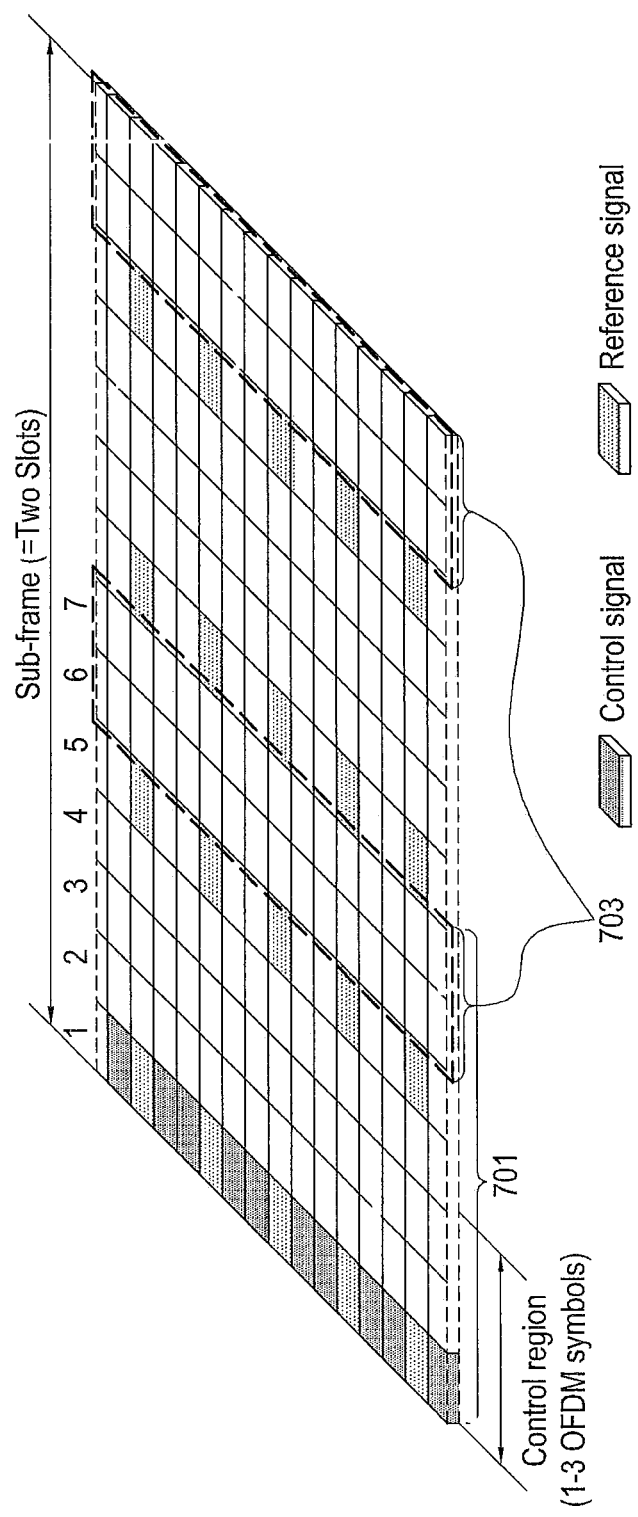
FIG. 7 is an example of a region of a sub-frame on which a control signal or a reference signal is not transmitted in a mobile communication system with a distributed cell structure according to this disclosure.

FIG. 7 is an example of a region of a sub-frame on which a control signal or a reference signal may not be transmitted in a mobile communication system with a distributed cell structure according to this disclosure.

Referring to FIG. 7, the number of OFDM symbols included in one slot in the first type of slot structure 605 and the second type of slot structure 607 in FIG. 6 can be decreased. This can be why a control signal and a reference signal may not be transmitted on a region 703 of the sixth symbol and the fifth symbol among symbols included in one slot 701 in a sub-frame structure of a conventional LTE system.

Like the first type of slot structure and the second type of slot structure proposed in an LTE system, to decrease the number of OFDM symbols included in a slot supported in a conventional LTE system by 1 or 2 may not affect an important signal necessary for a communication of an MS such as a control signal, a reference signal, and the like. It will be understood by those of ordinary skill in the art that this new slot structure may not be limited to an LTE system, and can be applied to various communication systems which use similar slot structures.

For convenience, a sub-frame and a frame to which the first type of slot structure can be called the first type of sub-frame and the first type of frame, respectively, and a sub-frame and a frame to which the second type of slot structure can be called the second type of sub-frame and the second type of frame, respectively.

A region of a sub-frame on which a control signal or a reference signal may not be transmitted in a mobile communication system with a distributed cell structure has been described with reference to FIG. 7, and an example of acquiring synchronization between BSs in a mobile communication system with a distributed cell structure according to an embodiment of the present disclosure will be described with reference to FIG. 8.

Figure 8:
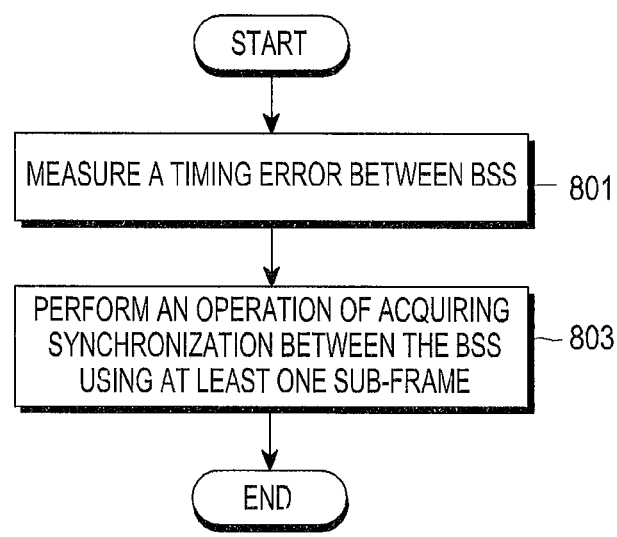
FIG. 8 is an example of a method of acquiring synchronization between BSs in a mobile communication system with a distributed cell structure according to this disclosure.

FIG. 8 is an example of a method of acquiring synchronization between BSs in a mobile communication system with a distributed cell structure according to this disclosure.

Referring to FIG. 8, for example, a method of acquiring synchronization between BSs can be performed if a timing error between the first BS which can be located at the first cell and the second BS which can be located at the second cell is greater than a threshold value. It will be assumed that the first cell and the second cell are included in a network structure in which a macro cell can be co-located with a small cell. If the first cell is the macro cell, the second cell can be the small cell. On the other hand, if the first cell is the small cell, the second cell can be the macro cell. Or, all of the first cell and the second cell can be small cells.

If the second BS of the second cell performs a synchronization operation with the first BS of the first cell, the second BS can measure a timing error with the first BS at operation 801. As described above, the timing error can be measured by transmitting/receiving a packet including a time stamp between BSs. The measurement of the timing error between the BSs can be performed using various known schemes as well as the time stamp, and a detailed description will be omitted herein.

If the measured timing error is greater than a preset threshold value, the second BS can perform a synchronization operation with the first BS by transmitting at least one sub-frame to which the first type of slot structure or the second type of slot structure can be applied on a transmission interruption interval 507 in a downlink at operation 803.

For example, if the measured timing error is greater than a symbol length of one OFDM symbol or the preset threshold value, the second BS can decrease a timing error within the symbol length of one OFDM by transmitting the first type of sub-frame to which the first type of slot structure can be applied one time or M times. Here, the M can denote an integer equal to or greater than 2.

The second BS can decrease a timing error within a CP length by transmitting the second type of sub-frame to which the second type of slot structure can be applied one time or M times. If the timing error with the first BS is less than the symbol length of one OFDM symbol or equal to or less than the preset threshold value, the second BS may not perform a synchronization operation using the first type of sub-frame, and can perform a synchronization operation using only the second type of sub-frame.

An example of acquiring synchronization between BSs in a mobile communication system with a distributed cell structure has been described with reference to FIG. 8, and another example of acquiring synchronization between BSs in a mobile communication system with a distributed cell structure will be described with reference to FIG. 9.

Figure 9:
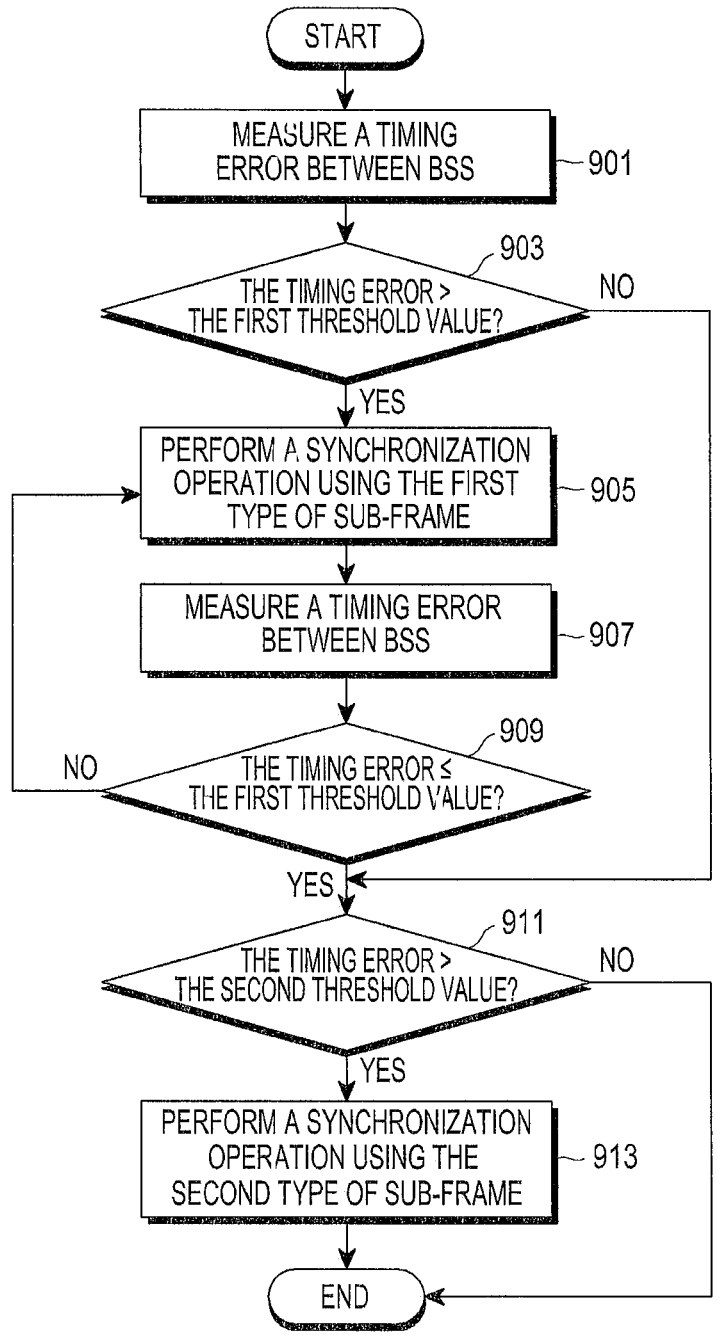
FIG. 9 is another example of a method of acquiring synchronization between BSs in a mobile communication system with a distributed cell structure according to this disclosure.

FIG. 9 is another example of a method of acquiring synchronization between BSs in a mobile communication system with a distributed cell structure according to this disclosure.

Referring to FIG. 9, it will be noted that a synchronization method in FIG. 9 describes a synchronization method in FIG. 8, but with greater specificity.

Referring to FIG. 9, the second BS can measure a timing error τ with the first BS at operation 901. The second BS can determine whether the timing error τ is greater than the first threshold value $\tau_A$ at operation 903. If the timing error τ is greater than the first threshold value $\tau_A$, the second BS can determine that the timing error τ is greater than a symbol length of one OFDM symbol.

The second BS can perform a synchronization operation using the first type of sub-frame at operation 905. The first threshold value $\tau_A$ can be set to a value which can be less than a maximum slot timing error and can be greater than $T_{CP}+T_U$ (a symbol length of one OFDM symbol including a CP). For example, in an LTE system, a length of one slot $T_{SLOT}$ can be 0.5 ms, and if a timing error is determined based on a slot, the maximum slot timing error can be set to ½ of the slot length 0.25 ms. The $T_{CP}$ can denote a CP length, and $T_U$ can denote a symbol length except for the CP length $T_{CP}$ in an OFDM symbol. It will be understood that the first threshold value can be used for a slot basis synchronization operation.

The second BS can measure a timing error τ with the first BS at operation 907. The second BS can determine whether the timing error τ measured at operation 907 is equal to or less than the first threshold value $\tau_A$ at operation 909. If the timing error τ measured at operation 907 is still greater than the first threshold value $\tau_A$, the second BS can repetitively perform operations 905 to 909.

The synchronization operation using the first type of sub-frame can be repetitively performed until the timing error τ is less than the symbol length of one OFDM symbol on a slot basis. If the synchronization operation using the first type of sub-frame is successfully performed, the timing error τ can satisfy a criterion such as $\tau < T_{CP} + T_U = T_{Symbol} = 71.4$ μs.

If the timing error τ measured at operation 909 is equal to or less than the first threshold value $\tau_A$, the second BS can determine whether the timing error τ is greater than the second threshold value $\tau_B$ at operation 911. Here, if the timing error τ is greater than the second threshold value $\tau_B$, the second BS can determine that the timing error τ is greater than a CP length of one CP. The second BS can perform a synchronization operation using the second type of sub-frame at operation 913.

If the timing error τ is equal to or less than the first threshold value $\tau_A$, the second BS can proceed to operation 911. Here, the second threshold value $\tau_B$ can be set to a value less than a maximum symbol timing error and greater than a CP length of one CP $T_{CP}$, such as 4.7 μs $< \tau_B <$ 35.7 μs. This is why a symbol length of one OFDM symbol can be $T_{CP}+T_U=T_{Symbol}=71.4$ μs in an LTE system, and the maximum symbol timing error can be set to ½ of a symbol length $$\frac{T_{Symbol}}{2} = 35.7 \text{ μs}$$

if the timing error is determined on a symbol basis. Here, $T_{symbol}$ can denote a length of an OFDM symbol including a CP. It will be understood that the second threshold value $\tau_B$ can be a threshold value for a symbol basis synchronization operation.

In FIG. 9, a scheme of determining the maximum slot timing error and the maximum symbol timing error for setting the first threshold value and the second threshold value is just one example, however, it will be understood by those of ordinary skill in the art that an appropriate value for the slot basis synchronization operation and an appropriate value for the symbol basis synchronization operation can be set within a slot length and a symbol length, respectively.

Although FIG. 9 is another example of acquiring synchronization between BSs in a mobile communication system with a distributed cell structure according to this disclosure, various changes could be made to FIG. 9. For example, while shown as a series of operations, various operations in FIG. 9 could overlap, occur in parallel, occur in a different order, or occur multiple times.

Another example of acquiring synchronization between BSs in a mobile communication system with a distributed cell structure according to this disclosure has been described with reference to FIG. 9, and an example of a slot length and a symbol length used in an LTE system according to this disclosure will be described with reference to FIG. 10.

Figure 10:
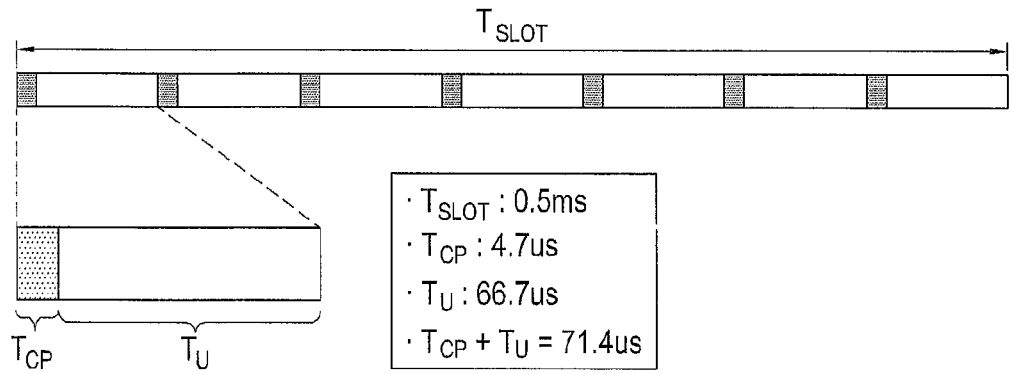
FIG. 10 is an example of a slot length and a symbol length used in an LTE system according to this disclosure.

FIG. 10 is an example of a slot length and a symbol length used in an LTE system according to this disclosure.

Referring to FIG. 10, an example of a slot length $T_{SLOT}$, a CP length $T_{CP}$, a symbol length $T_U$ except for the CP length, and a symbol length $T_{CP}+T_U$ including the CP length in FIG. 9 are described, however, it will be understood by those of ordinary skill in the art that an embodiments disclosed herein may not be limited to this.

A synchronization operation using the second type of sub-frame in FIG. 9 can be repetitively performed until a timing error is less than a CP length of one CP. So, if the synchronization operation using the second type of sub-frame is successfully performed, a timing error τ can satisfy a criterion, such as $\tau < T_{CP} = 4.7$ μs.

An example of a slot length and a symbol length used in an LTE system has been described with reference to FIG. 10, and a procedure of transmitting control information from a BS to an MS in a case that an operation of acquiring synchronization between BSs can be performed in an LTE system will be described with reference to FIG. 11.

Figure 11:
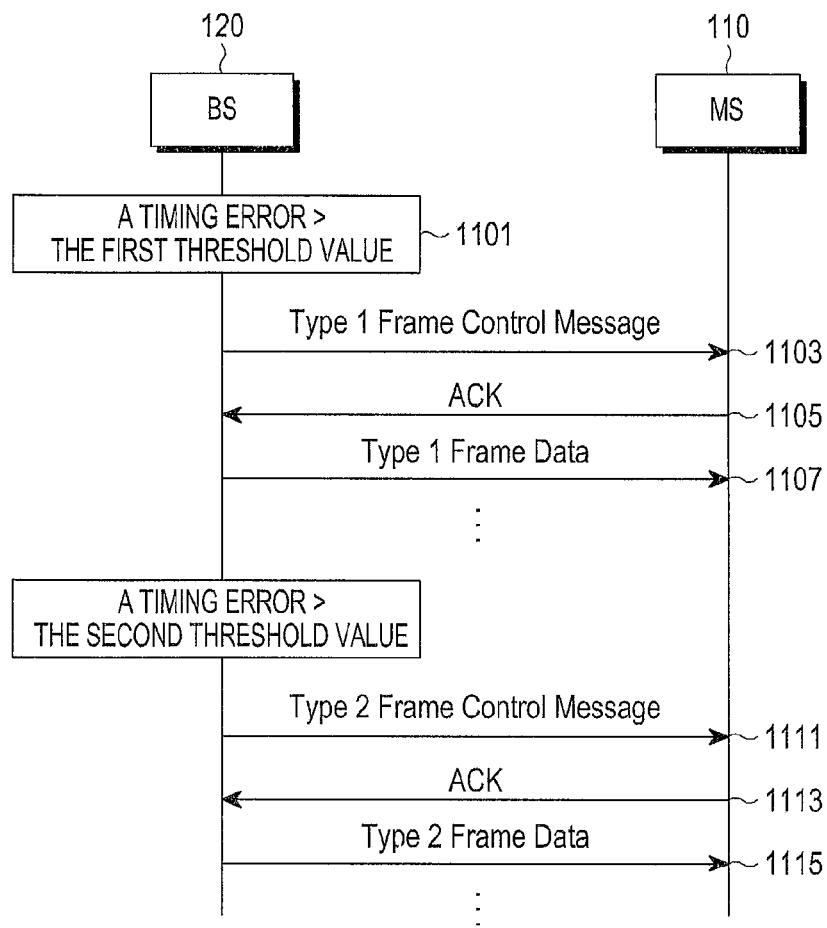
FIG. 11 is an example of a procedure of transmitting control information from a BS to an MS in a case that an operation of acquiring synchronization between BSs is performed in an LTE system according to this disclosure.

FIG. 11 is an example of a procedure of transmitting control information from a BS to an MS in a case that an operation of acquiring synchronization between BSs is performed in an LTE system according to this disclosure.

Referring to FIG. 11, it will be noted that a procedure of transmitting control information from a BS to an MS in a case that an operation of acquiring synchronization between BSs is performed can be a procedure of transmitting control information which indicates that downlink transmission can be performed using the first type of sub-frame and the second type of sub-frame from a BS (such as the second BS in FIG. 9) to an MS in a case that an operation of acquiring synchronization between BSs is performed.

Referring to FIG. 11, if a BS 120 determines that a timing error is greater than the first threshold value at operation 1101, the BS 120 can transmit control information indicating that the first type of sub-frame (or the first type of slot) for slot basis synchronization can be applied to downlink transmission on a transmission interruption interval 507 in FIG. 5, such as a type 1 frame control message to an MS 110 at operation 1103. After receiving the control information, the MS 110 can transmit an acknowledgment (ACK) message to the BS 120 at operation 1105, and the BS 120 can transmit a frame signal with the first type of sub-frame (or the first type of slot) on the transmission interruption interval 507 in FIG. 5 to the MS 110 at operation 1107. If the timing error is equal to or less than the first threshold value at operation 1101, operations 1103 to 1107 can be omitted.

If the BS 120 determines that the timing error is greater than the second threshold value, the BS 120 can transmit control information indicating that the second type of sub-frame (or the second type of slot) for symbol basis synchronization is applied to downlink transmission on the transmission interruption interval 507 in FIG. 5, such as a type 2 frame control message to the MS 110 at operation 1111. After receiving the control information, the MS 110 can transmit an ACK message to the BS 120 at operation 1113, and the BS 120 can transmit a frame signal with the second type of sub-frame (or the second type of slot) on the transmission interruption interval 507 in FIG. 5 to the MS 110 at operation 1115.

Although FIG. is an example of a procedure of transmitting control information from a BS to an MS in a case that an operation of acquiring synchronization between BSs is performed in an LTE system according to this disclosure, various changes could be made to FIG. 11. For example, while shown as a series of operations, various operations in FIG. 11 could overlap, occur in parallel, occur in a different order, or occur multiple times.

Meanwhile, in an embodiment, a frame signal to which the first type of slot structure and the second type of slot structure are applied can be transmitted on a transmission interruption interval 507 in FIG. 5, but may not be transmitted on another interval. In another embodiment, if a timing error is greater than a preset threshold value, it can be possible to adaptively apply the first type of slot structure and the second type of slot structure.

For example, in an LTE system, a new CP length ($T_{NCP}$) used in the second type of slot structure in order to decrease overhead on transmitting control information can be used as a preset one of quantization values which are generated by a preset number of steps. If the $T_{NCP}$ is quantized to five steps within a range from $512T_S$ to $1020T_S$, the $T_{NCP}$ can be used as one of $T_{NCP} \in \{612T_S, 712T_S, 812T_S, 912T_S, 1012T_S\}$. The $T_S$ can denote a basic time unit in an LTE system as in Table 1. In this case, a BS can decrease information quantity necessary for transmitting the new CP length ($T_{NCP}$), so overhead due to transmission of control information can decrease. Here, a scheme of transmitting the control information can be selectively performed.

A process of acquiring synchronization between BSs which uses the first type of slot structure in an LTE system will be described with reference to FIGS. 12 to 14.

Figure 12:
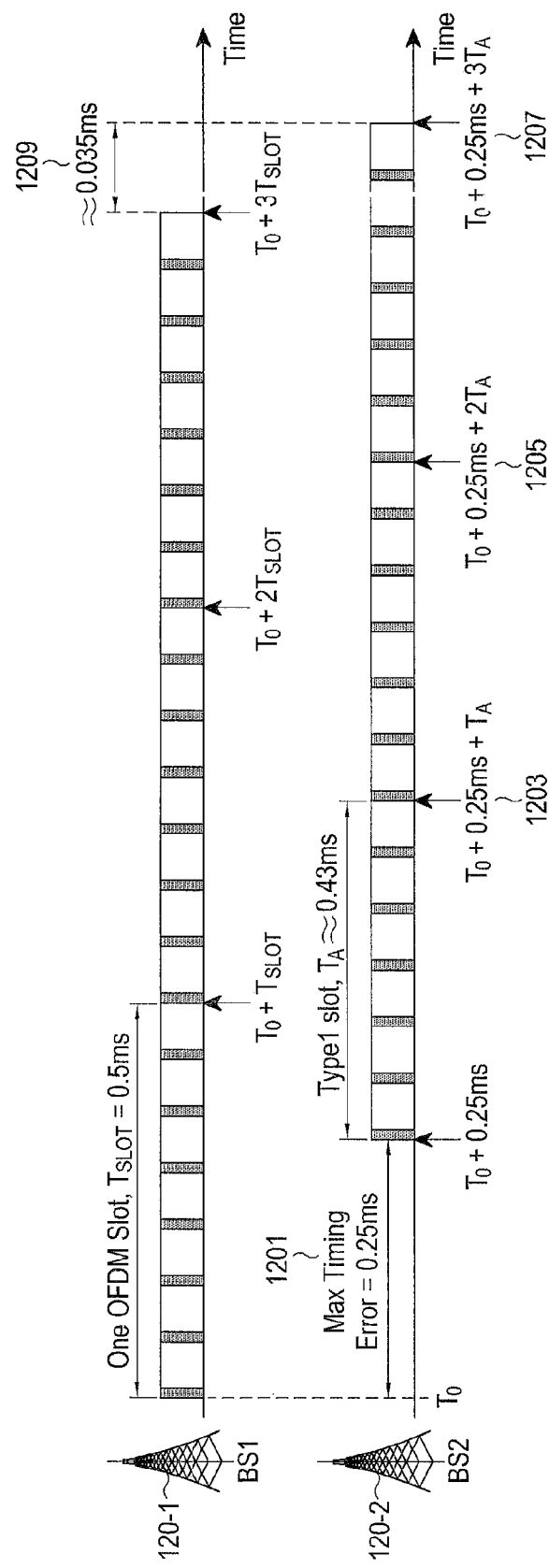
FIGS. 12 to 14 are examples of processes of acquiring synchronization between BSs which uses the first type of slot structure in an LTE system according this disclosure.
Figure 13:
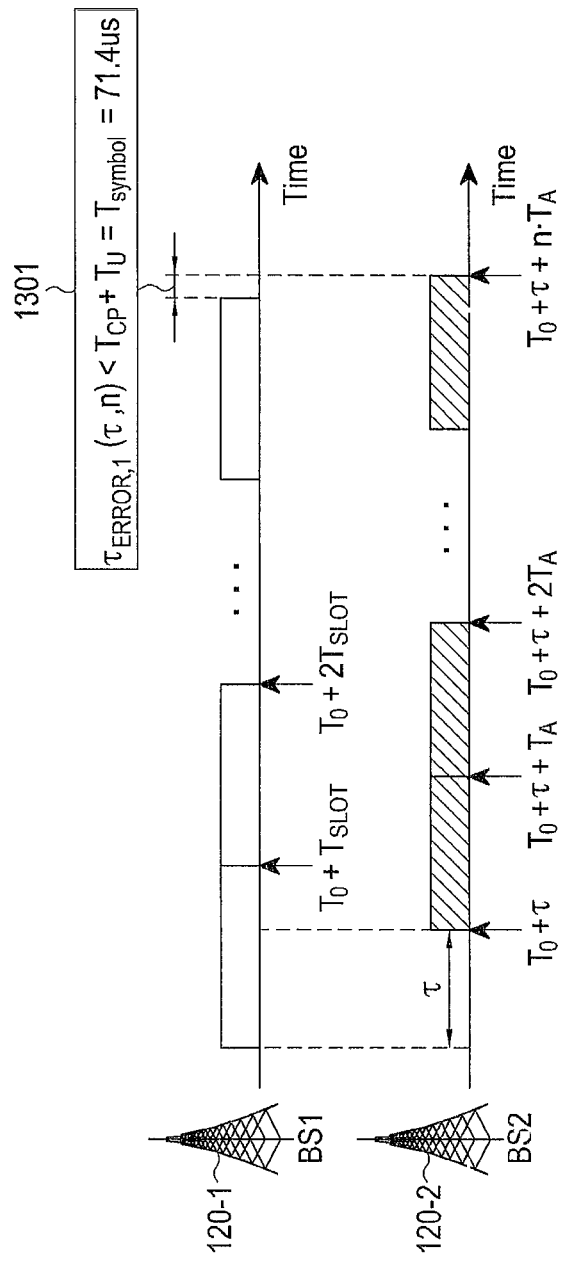
Figure 14:
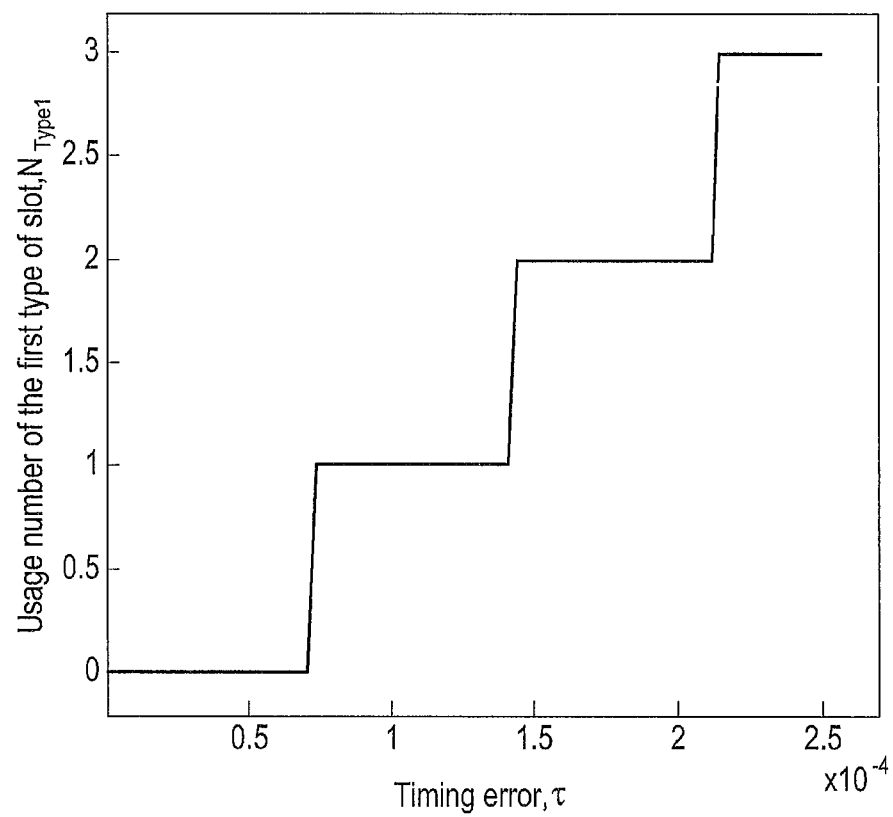

FIGS. 12 to 14 are example processes of acquiring synchronization between BSs which use the first type of slot structure in an LTE system according to this disclosure.

Referring to FIG. 12, in an LTE system, a timing error 1201 can occur up to 0.25 ms on a slot basis for a slot length $T_{SLOT} = 0.5$ ms. If a 0.25 ms of timing error 1201 occurs, a timing error 1209 can be decreased within about 35 μs(=0.035 ms) by performing a synchronization operation using the first type of slot structure M times, such as 3 times (1203, 1205, 1207). A 35 μs of timing error can be less than a symbol length of a normal OFDM symbol 72 μs. So, synchronization between the first BS 120-1 and the second BS 1202 can be acquired by repetitively performing the synchronization operation using the first type of slot structure to decrease a timing error within a symbol length of one normal OFDM symbol.

Referring to FIG. 13, if an initial timing error is τ and the second BS 120-2 uses the first type of slot n times for acquiring synchronization for the first BS 120-1, a timing error $\tau_{ERROR,1}(\tau,n)$ can be calculated as Equation (1).

$$\tau_{ERROR,1}(\tau, n) = \left|\left(\tau + T_A \cdot n + \frac{T_{SLOT}}{2}\right) \% \, T_{SLOT} - \frac{T_{SLOT}}{2}\right| \quad \text{Equation (1)}$$

where, $T_{SLOT}$ can denote a slot length, such as 0.5 ms, % can denote a remainder operator, and $T_A$ can denote the first type of slot length.

In Equation (1), an operation of adding $$\frac{T_{SLOT}}{2}$$

and subtracting $$\frac{T_{SLOT}}{2}$$

can be for limiting a range of a timing error $\tau_{ERROR,1}(\tau,n)$ within $$0 < t_{ERROR,1(t,n)} < \frac{T_{SLOT}}{2}.$$

As illustrated in 1301, if a minimum n is $N_{Type1}$, the $N_{Type1}$ can indicate a repetition usage number of the first type of slot for acquiring slot basis synchronization. Here, the $N_{Type1}$ can denote a minimum n which satisfies $\tau_{ERROR,1}(\tau,n)<T_{Symbol}=71.4$ μs.

An equation including an absolute value operator and a remainder operator may not be analytically solved, however, the repetition usage number of the first type of slot $N_{Type1}$ which can be acquired through an experiment can be expressed as Equation (2) within a range of each timing error $\tau$.

$$N_{Type1} = \begin{cases} 0, & 0 \leq \tau < T_{Symbol} \\ 1, & T_{Symbol} \leq \tau < 2T_{Symbol} \\ 2, & 2T_{Symbol} \leq \tau < 3T_{Symbol} \\ 3, & 3T_{Symbol} \leq \tau < \frac{T_{SLOT}}{2} \end{cases} \quad \text{Equation (2)}$$

A repetition usage number for the first type of slot structure due to a timing error when an operation of acquiring synchronization between BSs can be performed in an LTE system is illustrated in FIG. 14.

A process of acquiring synchronization between BSs which uses the first type of slot structure in an LTE system has been described with reference to FIGS. 12 to 14, and a process of acquiring synchronization between BSs which uses the second type of slot structure in an LTE system will be described with reference to FIGS. 15 to 18.

FIGS. 15 to 18 are example processes of acquiring synchronization between BSs which use the second type of slot structure in an LTE system according to his disclosure.

Figure 15:
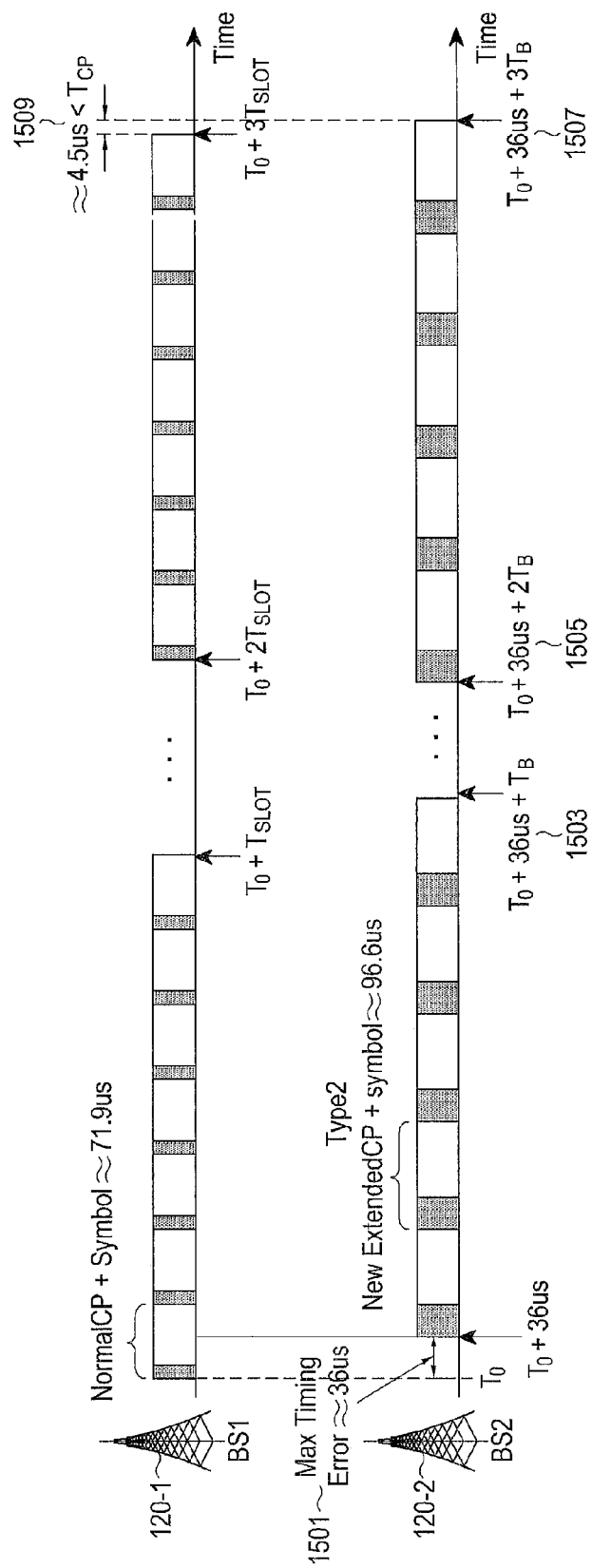
FIGS. 15 to 18 are examples of processes of acquiring synchronization between BSs which uses the second type of slot structure in an LTE system according to this disclosure.

Referring to FIG. 15, in an LTE system, a timing error 1501 can occur up to 36 μs on a symbol basis for a symbol length of an OFDM symbol including a normal CP $T_{Symbol}$. If a 36 μS of timing error 1501 occurs, a timing error 1509 can be decreased within about 4.5 μs by performing a synchronization operation using the second type of slot structure M times, such as 3 times (1503, 1505, 1507). A 4.5 μs of timing error can be less than a CP length of a normal CP 4.7 μs. So, synchronization between the first BS 120-1 and the second BS 1202 can be acquired by repetitively performing the synchronization operation using the second type of slot structure to decrease a timing error within a CP length of one normal CP. In FIG. 15, the CP length of the new CP ($T_{NCP}$) can be 920 $T_S \approx 29.9$ μs.

Figure 16:
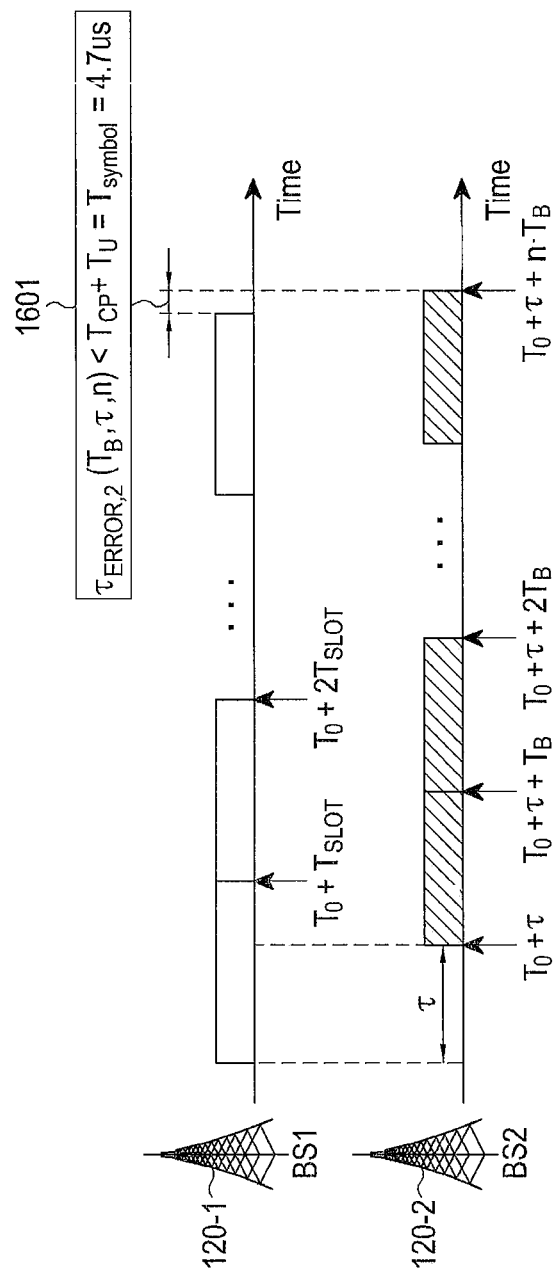

Referring to FIG. 16, if an initial timing error is $\tau$ and the second BS 120-2 uses the second type of slot n times for acquiring synchronization for the first BS 120-1, a timing error $\tau_{ERROR,2}(T_B,\tau,n)$ can be calculated as Equation (3).

$$\tau_{ERROR,2}(\tau, n) = \left| \left( \tau + T_B \cdot n + \frac{T_{SLOT}}{2} \right) \% T_{SLOT} - \frac{T_{SLOT}}{2} \right| \quad \text{Equation (3)}$$

where, $T_B$ can denote the second type of slot length and can be changed according to a length of a variable CP $T_{NCP}$ of an OFDM symbol which can be supported in the second type of slot structure. As illustrated in 1601, if a minimum n is $N_{Type2}(T_B)$, the $N_{Type2}(T_B)$ can indicate a repetition usage number of the second type of slot for) acquiring symbol basis synchronization. Here, the $N_{Type2}(T_B)$ can denote a minimum n which satisfies $\tau_{ERROR,2}(T_B,\tau,n) < T_{CP} = 4.7$ μs. The $N_{Type2}(T_B)$ may not be analytically acquired. It will be assumed that $T_{NCP}=712$ $T_S \approx 23.2$ μs and $T_B \approx 0.449$ ms, so the repetition usage number $N_{Type2}(T_B)$ of the second type of slot which can be acquired through an experiment can be expressed as Equation (4) within a range of each timing error $\tau$.

$$N_{Type2}(T_B = 0.449 \text{ ms}) = \begin{cases} 0, & 0 \leq \tau < 711T_S \\ 10, & 712T_S \leq \tau < 721T_S \\ 1, & 722T_S \leq \tau < \frac{T_{Symbol}}{2} \end{cases} \quad \text{Equation (4)}$$

If $T_B=0.44$ ms, a maximum usage number and an average usage number of $N_{Type2}$ can be 10 and 1.43, respectively. If the maximum usage number and the average usage number of $N_{Type2}$ are called Max $N_{Type2}(T_B)$ and Mean $N_{Type2}(T_B)$, respectively, a maximum usage number and an average usage number of a slot according to the second type of slot length $T_B$ can be experimentally acquired as shown in FIGS. 17 and 18.

Figure 17:
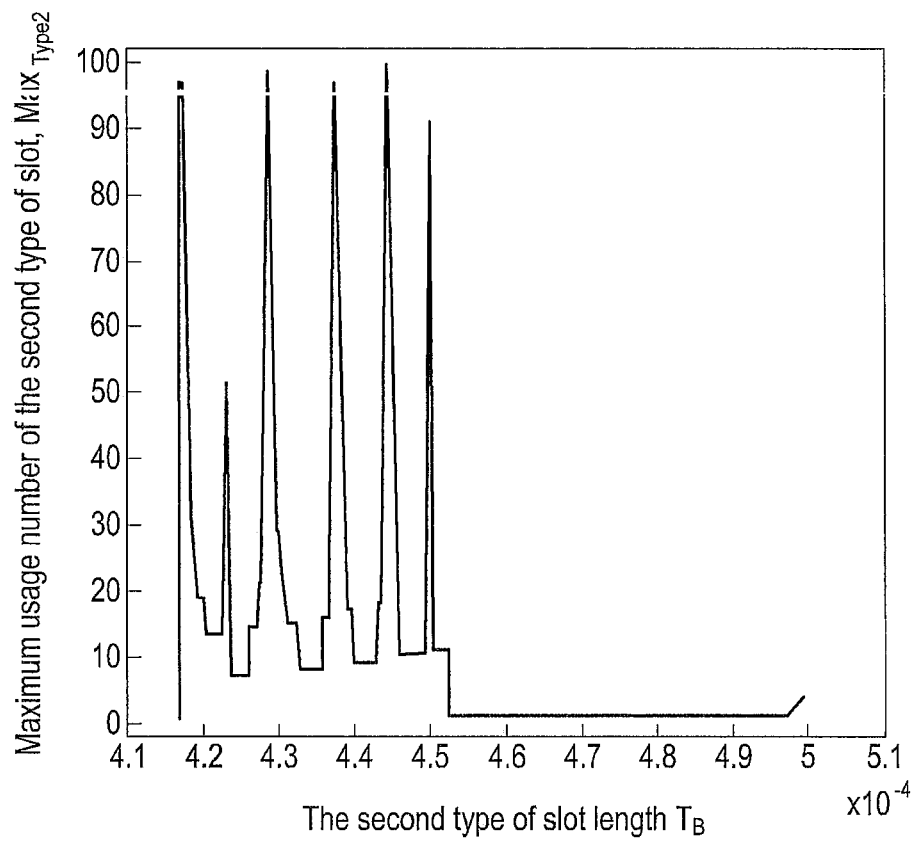
Figure 18:
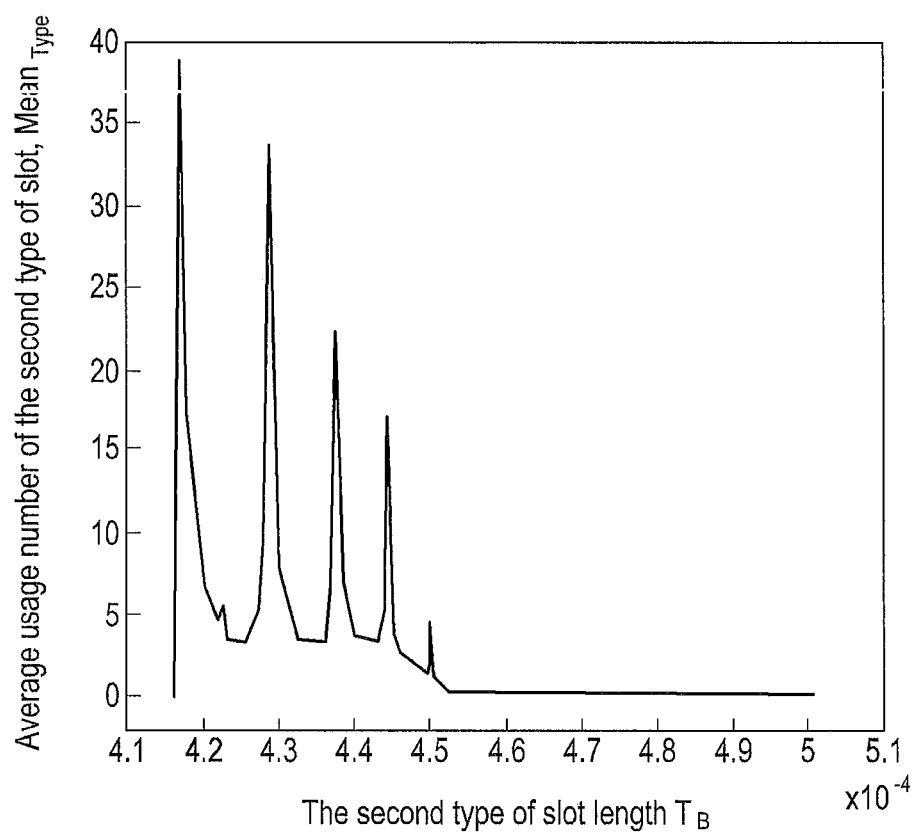

Referring to FIGS. 17 and 18, it will be understood that an average usage number and a maximum usage number can be increased/decreased according to $T_B$ up to about $T_B=0.45$ ms, and the average usage number and the maximum usage number can be remarkably decreased if $T_B > 0.45$ ms.

A method for acquiring synchronization between BSs which can be applied to an LTE system supporting an FDD scheme has been described.

Figure 4:
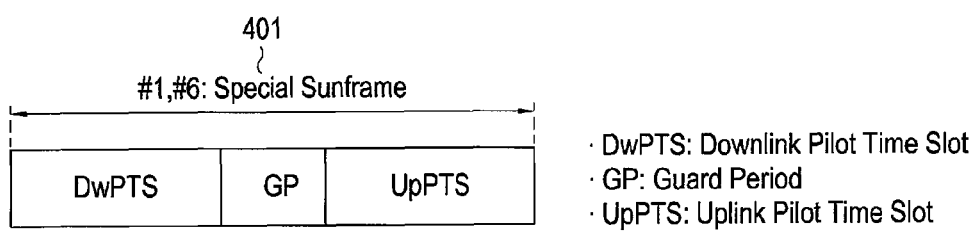
FIG. 4 is an example of a special sub-frame structure in a downlink frame in a conventional LTE system supporting a TDD scheme.

Also, a method of acquiring synchronization between BSs can be applied to normal sub-frames except for a special sub-frame in FIG. 4 in an LTE system supporting a TDD scheme. That is, the first type of slot structure and the second type of slot structure can be applied to the normal sub-frames in the LTE system supporting the TDD scheme. There can be a need for re-defining a sub-frame structure if the number of symbols included in the special sub-frame is decreased.

A structure of a special sub-frame in an LTE system supporting a TDD scheme will be described with reference to FIG. 19.

Figure 19:
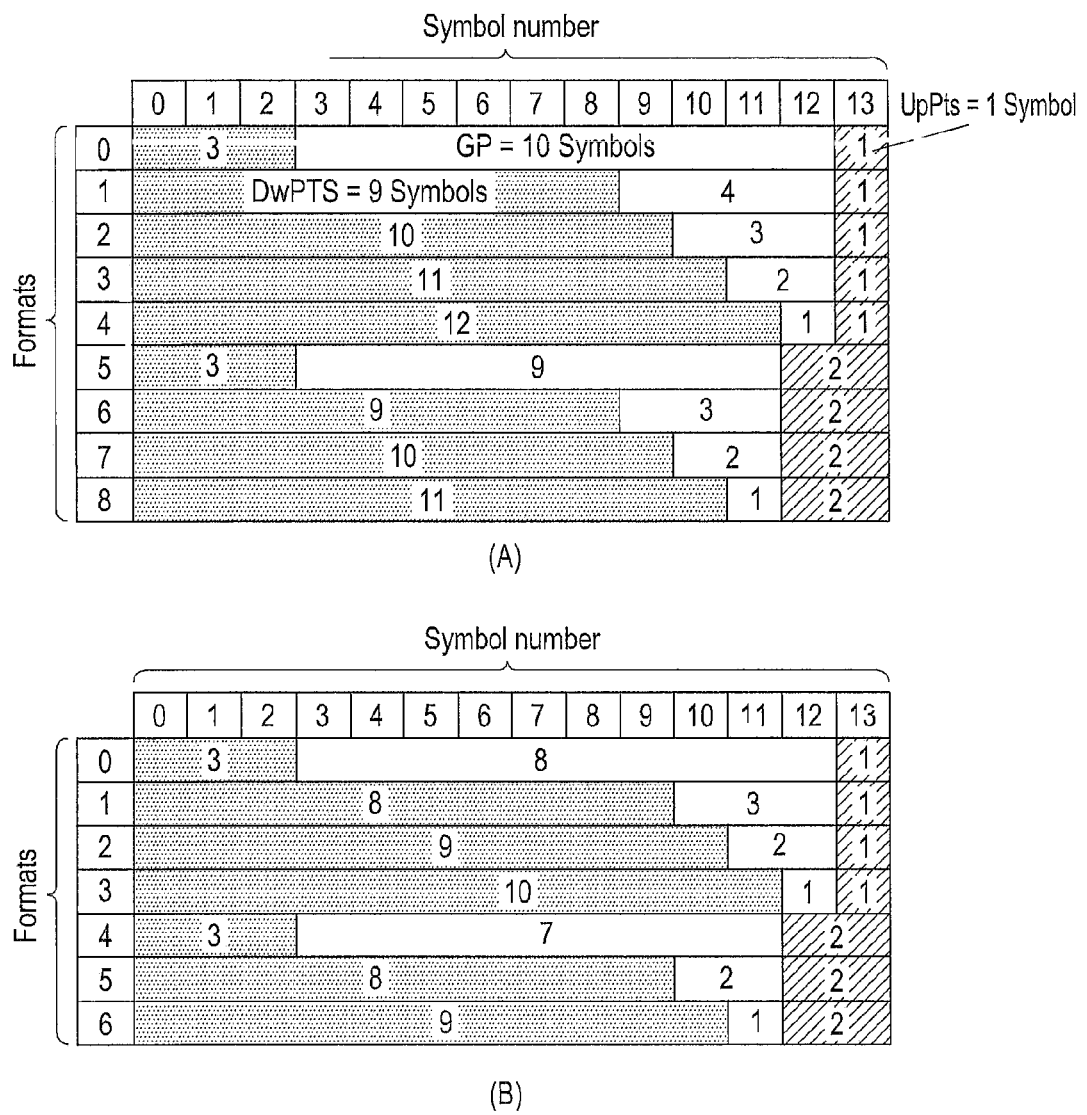
FIG. 19 is an example of a structure of a special sub-frame in an LTE system supporting a TDD scheme according to this disclosure.

FIG. 19 is an example of a structure of a special sub-frame in an LTE system supporting a TDD scheme according to this disclosure.

Referring to FIG. 19, a DwPTS, a GP, and a UpPTS can denote a downlink pilot time slot, a guard period, and a uplink pilot time slot, respectively. The special sub-frame can function as a switching point between a downlink and a uplink. Lengths of the DwPTS, the GP, and the UpPTS can use different formats from one another according to a TDD scheme, and a length of each field can be variable at least similar to (A) and (B).

In FIG. 19, (A) and (B) can express various formats of the special sub-frame in a conventional LTE system supporting a TDD scheme.

A structure of a special sub-frame in an LTE system supporting a TDD scheme has been described with reference to FIG. 19, and a new structure of a special sub-frame in a case that a method of acquiring synchronization between BSs is applied to an LTE system supporting a TDD scheme will be described with reference to FIG. 20.

Figure 20:
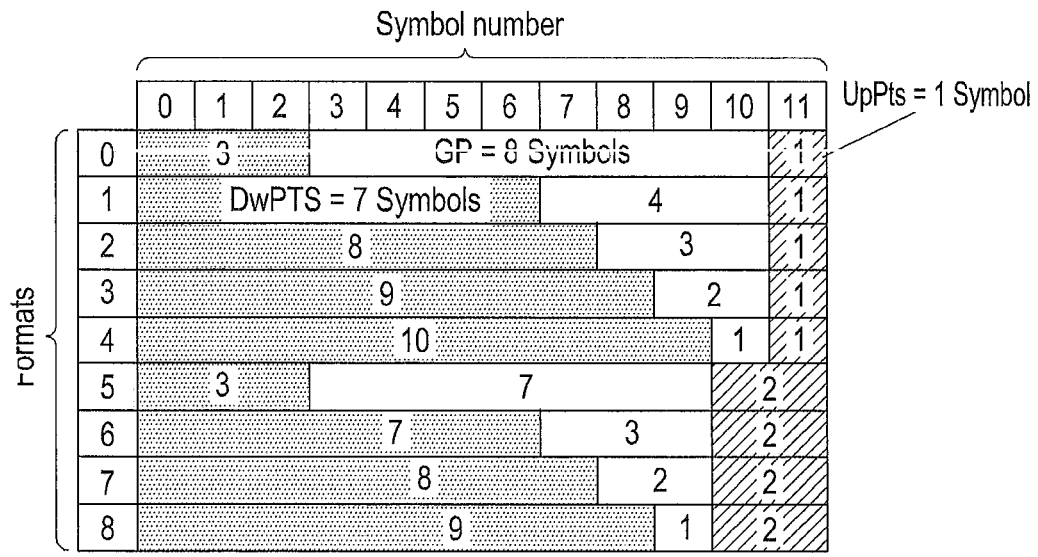
FIG. 20 is an example of a new structure of a special sub-frame in a case that a method of acquiring synchronization between BSs is applied to an LTE system supporting a TDD scheme according to this disclosure.
Figure 20:
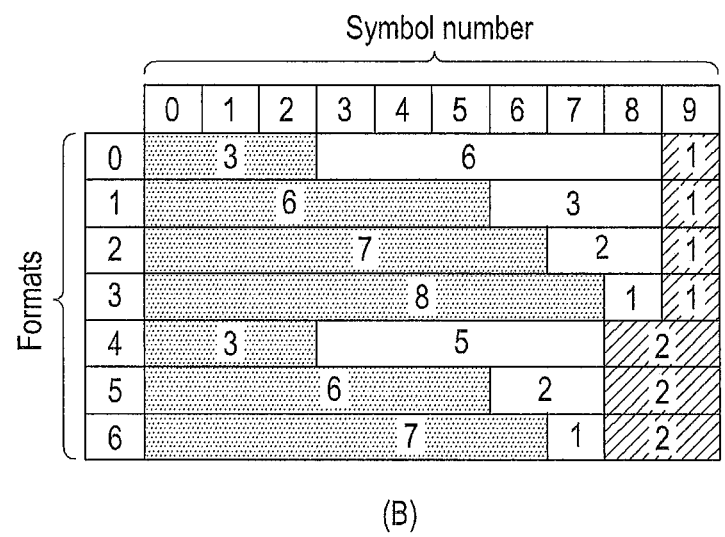

FIG. 20 is an example of a new structure of a special sub-frame in a case that a method of acquiring synchronization between BSs according to this disclosure can be applied to an LTE system supporting a TDD scheme.

Referring to FIG. 20, a special sub-frame can be generated by decreasing the number of symbols included in a DwPTS or a GP in a special sub-frame in FIG. 19 by 2.

In FIG. 20, (A) illustrates a structure of the first type of special sub-frame which can be used if a synchronization operation for decreasing a timing error between BSs within a symbol length of one OFDM symbol is performed, and (B) illustrates a structure of the second type of special sub-frame which is used if a synchronization operation for decreasing a timing error between BSs within a CP length of one CP can be performed. In the second type of special sub-frame, a variable length of CP can be used like a synchronization operation in an LTE system supporting an FDD scheme.

Like the LTE system supporting the FDD scheme, in an LTE system supporting a TDD scheme, a timing error can be measured, and if the timing error is greater than a threshold value, synchronization can be acquired within a symbol length of one symbol using the first type of special sub-frame and can be acquired within a CP length of one CP using the second type of special sub-frame.

If an initially measured timing error is less than the symbol length of one symbol or the threshold value, a synchronization operation using the first type of special sub-frame can be omitted, and a synchronization operation using the second type of special sub-frame can be performed.

Although not shown in FIG. 20, it will be understood by those of ordinary skill in the art that the first type of special sub-frame and the second type of special sub-frame can be generated by decreasing the number of symbols included in a DwPTS or a GP in a special sub-frame in FIG. 19 by 1.

In an embodiment, a BS can include the first communication interface for performing a communication with another BS, the second communication interface configured to perform a communication with an MS, and a controller configured to control the overall operation of acquiring synchronization between BSs according to the manner described with reference to FIGS. 8 to 20.

For example, a BS in a mobile communication system with a distributed cell structure can transmit/receive information used for measuring the timing error with the other BS through the first communication interface, and control an operation of measuring the timing error based on the information and performing synchronization with the other BS using at least one second sub-frame which includes symbols of which the number is less than the number of symbols included in the first sub-frame by at least 1 based on the measured timing error through the controller.

The BS can transmit control information including at least one of information on the first type of sub-frame and information on the second type of sub-frame to the MS through the second communication interface. As described above, a new sub-frame (or slot) structure of which a length can be shorter than a conventional sub-frame (or slot) length in each of an FDD scheme and a TDD scheme in a conventional LTE system. So, an embodiment of the present disclosure can enable the transmission of the new sub-frame in a conventional transmission interruption interval if an operation of acquiring synchronization between BSs can be performed thereby preventing transmission interruption of a BS occurred in the operation of acquiring the synchronization between the BSs and a unnecessary re-connection of an MS due to the transmission interruption.

Certain aspects of the present disclosure can also be embodied as computer readable code on a computer readable recording medium. A computer readable recording medium can be any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable read only memory (ROM), a memory, for example, a random access memory (RAM, a memory chip, a memory device, or a memory integrated circuit (IC), or an optically or magnetically recordable non-transitory machine-readable, such as computer-readable, storage medium, such as a compact disk (CD), a digital versatile disk (DVD), a magnetic disk, or a magnetic tape. A method and apparatus according to an embodiment of the present disclosure can be implemented by a computer or a mobile terminal that includes a controller and a memory, and the memory can be an example of a non-transitory machine-readable, such as computer-readable, storage medium suitable to store a program or programs including instructions for implementing various embodiments of the present disclosure.

The present disclosure can include a program including code for implementing the apparatus and method as defined by the appended claims, and a non-transitory machine-readable, such as computer-readable, storage medium storing the program. The program can be electronically transferred via any media, such as communication signals, which are transmitted through wired and/or wireless connections, and the present disclosure can include their equivalents.

An apparatus according to an embodiment of the present disclosure can receive the program from a program providing device which is connected to the apparatus via a wire or a wireless and store the program. The program providing device can include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for acquiring by a base station (BS) synchronization between BSs in a mobile communication system with a distributed cell structure, the method comprising:
measuring a timing error with another BS as a synchronization target; and
performing a synchronization operation with the other BS using at least one first sub-frame based on the measured timing error,
wherein a number of symbols in the first sub-frame is less than a number of symbols in a second sub-frame, and
wherein the at least one first sub-frame comprises one of a first type of sub-frame in which a cyclic prefix (CP) length of a CP included in each symbol is equal to a CP length of the second sub-frame and a second type of sub-frame in which, a CP length is variable within a preset range of CP lengths.

2. The method of claim 1, wherein the at least one first sub-frame is a sub-frame which is transmitted to a mobile station (MS) on a preset specific-interval if the BS performs the synchronization operation with the other BS.

3. The method of claim 1, wherein the first type of sub-frame is used for a slot basis synchronization operation, and wherein the second type of sub-frame is used for a symbol basis synchronization operation.

4. The method of claim 1, wherein each of the first type of sub-frame and the second type of sub-frame is transmitted as a sub-frame comprising all of a control signal and a reference signal which are transmitted on the second sub-frame.

5. The method of claim 1, wherein the synchronization operation between the BSs is performed if the timing error is greater than at least one threshold value, and
wherein the at least one threshold value is set based on at least one of a slot length, a symbol length, or a CP length.

6. The method of claim 1, wherein the performing of the synchronization operation comprises:
decreasing the timing error within a symbol length of one symbol by performing a first synchronization operation which uses the first type of sub-frame at least one time, or
decreasing the timing error within a CP length of one CP by performing a second synchronization operation which uses the second type of sub-frame at least one time.

7. The method of claim 6, wherein the first synchronization operation is performed by comparing the timing error with a first threshold value, and
wherein the first threshold value is set within a range which is greater than the symbol length of one symbol and less than a maximum slot timing error.

8. The method of claim 6, wherein the second synchronization operation is performed by comparing the timing error with a second threshold value, and
wherein the second threshold value is set within a range which is greater than the CP length of one CP and less than a maximum symbol timing error.

9. The method of claim 1, wherein the variable CP length on the second type of sub-frame is one of a plurality of CP lengths which are quantized to preset steps.

10. The method of claim 1, further comprising:
upon performing the synchronization operation, transmitting control information comprising at least one of information on the first type of sub-frame and information on the second type of sub-frame to a mobile station (MS).

11. A base station (BS) in a mobile communication system with a distributed cell structure, the BS comprising:
a communication interface configured to transmit/receive information for measuring a timing error with another BS to/from the other BS; and
a controller configured to control an operation of measuring the timing error based on the information, and perform a synchronization operation with the other BS using at least one first sub-frame based on the measured timing error,
wherein a number of symbols in the first sub-frame is less than a number of symbols in a second sub-frame, and
wherein the at least one first sub-frame comprises one of a first type of sub-frame in which a cyclic prefix (CP) length of a CP included in each symbol is equal to a CP length of the second sub-frame and a second type of sub-frame in which a CP length is variable within a preset range of CP length.

12. The BS of claim 11, wherein the at least one first sub-frame is a sub-frame which is transmitted to a mobile station (MS) on a preset specific-interval if the controller performs the synchronization operation with the other BS.

13. The BS of claim 11, wherein the first type of sub-frame is used for a slot basis synchronization operation, and wherein the second type of sub-frame is used for a symbol basis synchronization operation.

14. The BS of claim 11, wherein each of the first type of sub-frame and the second type of sub-frame is transmitted as a sub-frame comprising all of a control signal and a reference signal which are transmitted on the second sub-frame.

15. The BS of claim 11, wherein the synchronization operation between the BSs is performed if the timing error is greater than at least one threshold value, and
wherein the at least one threshold value is set based on at least one of a slot length, a symbol length, or a CP length.

16. The BS of claim 11, wherein the controller is configured to perform the synchronization operation by decreasing the timing error within a symbol length of one symbol by performing a first synchronization operation which uses the first type of sub-frame at least one time, or decreasing the timing error within a CP length of one CP by performing a second synchronization operation which uses the second type of sub-frame at least one time.

17. The BS of claim 16, wherein the first synchronization operation is compares the timing error with a first threshold value, and
wherein the first threshold value is set within a range which is greater than the symbol length of one symbol and less than a maximum slot timing error.

18. The BS of claim 16, wherein the second synchronization operation compares the timing error with a second threshold value, and
wherein the second threshold value is set within a range which is greater than the CP length of one CP and less than a maximum symbol timing error.

19. The BS of claim 11, wherein the variable CP length on the second type of sub-frame is one of a plurality of CP lengths which are quantized to preset steps.

20. The BS of claim 11, further comprising:
a communication interface configured to transmit control information comprising at least one of information on the first type of sub-frame and information on the second type of sub-frame to a mobile station (MS) if the controller performs the synchronization operation.

* * * * *